Patented June 4, 1946

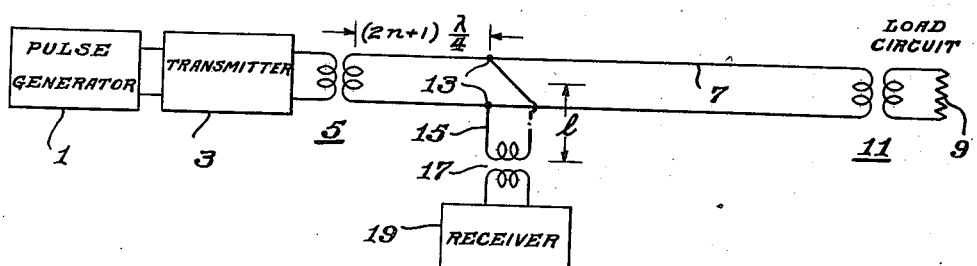
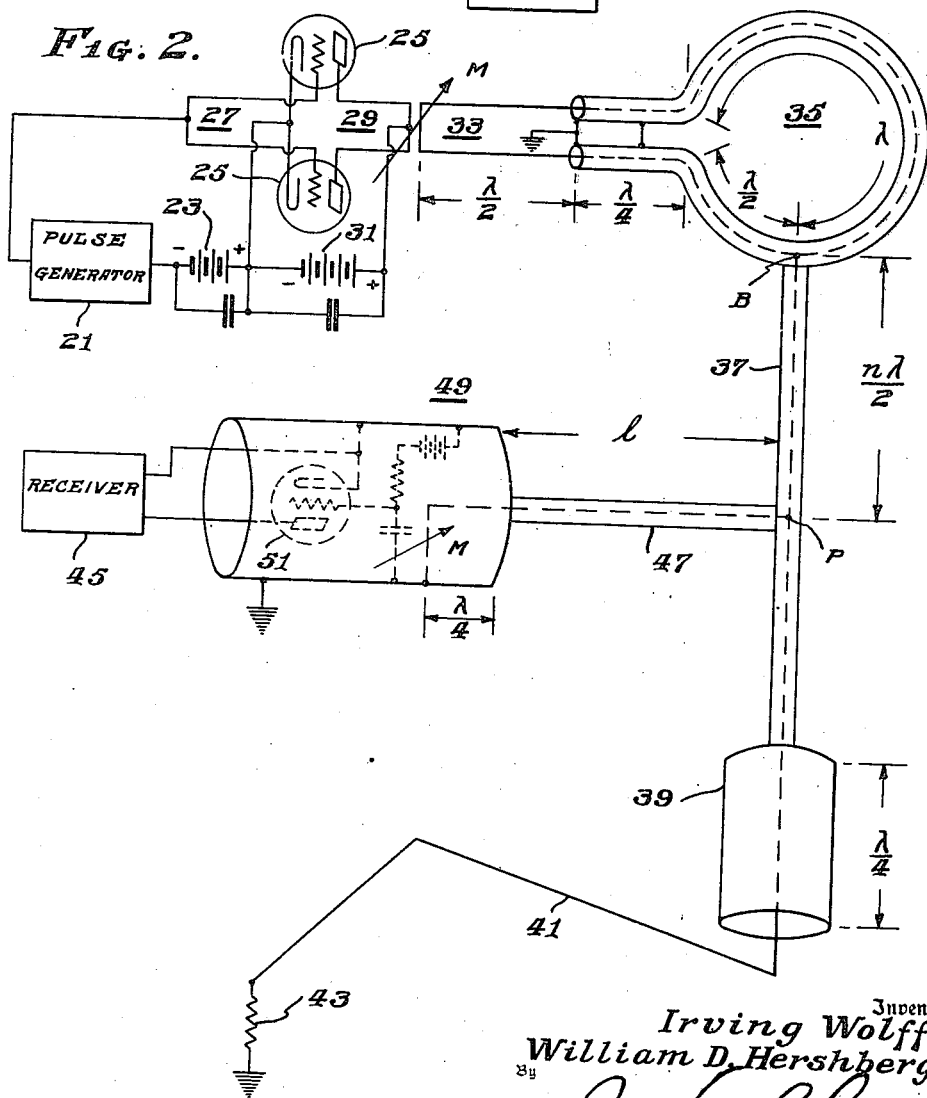

2,401,717

UNITED STATES PATENT OFFICE 2,401,717

SIGNALING SYSTEM

Irving Wolff, Merchantville, and William D. Hershberger, Collingswood, N. J., assignors to Radio Corporation of America, a corporation of Delaware Application January 11, 1938, Serial No. 184,354

18 Claims. (Cl. 250—13)

Our invention relates to signaling systems and especially to a signaling system in which outgoing signals are transmitted to the same load circuit from which the received signals return.

One practical application of our invention is to radio echo systems. In such systems a pulse of radio frequency energy is directionally radiated toward a distant, and generally invisible, object. The pulse has a period of the order of a microsecond or less duration. The pulse period is followed by an interval of a duration equal to somewhat more than twice the time required for the pulse to travel to the most distant object it is desired to detect and back, after reflection, to a suitable receiver. By way of example, the pulse may be ½ microsecond and the interval 49.5 microseconds for a maximum range of 3 to 4 miles.

When radio echo systems for obstacle detection are installed on aircraft, ships, and the like, space is often at a premium and it becomes difficult to erect a directive antenna array for transmitting and another for receiving. Although balancing systems may be employed with a common antenna, the difficulties of obtaining and maintaining a balance represents a substantial difficulty when the device is placed in the hands of an unskilled user. Also most balancing systems involve an energy loss. In our invention, the antenna or other load circuit is arranged for both transmitting and receiving without critical balancing. Furthermore, the dual use of the antenna or other load circuit for transmitting and receiving is effected with a negligible loss of power.

One of the objects of our invention is to provide means for effecting operation of a single antenna or load circuit for transmitting and receiving.

Another object is to provide means for operating a radio echo system of obstacle detection on a common antenna.

Another object is to provide means whereby a common load circuit is operated at substantially maximum efficiency for transmitting and receiving pulses of radio frequency energy without switching means.

A still further object is to provide means for effecting maximum energy transfer from a transmitter to a radiator and for connecting a receiver to a point in said transfer means such that maximum response to received signals is realized.

Our invention will be described by reference to the accompanying drawing in which Figure 1 is a schematic diagram, and Figure 2 is a diagram representing a preferred embodiment.

Referring to Fig. 1, a pulse generator 1 is connected to a transmitter 3. The output of the transmitter is connected through a matching transformer 5 to a transmission system or line 7, which is coupled to a load circuit 9, such as a dipole or other suitable antenna, through a second matching transformer 11. Across points 13, which are in the instant case spaced $$(2n+1)\frac{\lambda}{4}$$

from the first transformer 5, are connected a second transmission line 15 which terminates at a distance $l$ in a third matching transformer 17. The output portion of the third transformer is connected to a radio receiver 19.

It should be understood that the transmitter 3 is connected to the antenna 9, through the matching transformers, in a manner which insures maximum transfer of power and therefore the most efficient radiation of the radio frequency pulses. At the ultra high frequencies which are generally employed in radio echo devices the receivers do not attain their maximum sensitivity on maximum applied potentials, but require, for maximum sensitivity, maximum applied power. Therefore, it is desirable to connect the receiver to the antenna to satisfy two requirements: first, to provide maximum applied power to the receiver from the antenna; second, to divert a minimum amount of power to the receiver when the transmission line is transferring power from the transmitter to the antenna.

The first requirement is effected by transforming the input impedance of the receiver to match the characteristic impedance of the lines, and also by matching the load circuit to the impedance of the lines. It is further necessary to adjust the transmitter branch; i. e., from the junction 13 to the transformer 5, so that it abstracts a minimum amount of energy from the received signal. This last condition is realized in the instant arrangement by adjusting the length of the line between the junction point and the transmitter. In the present arrangement the transmitter output circuit is of low impedance during the interval when the transmitter is keyed off and therefore the length of the line in the transmitter branch is made substantially equal to $$(2n + 1)\frac{\lambda}{4}$$

where $n$ is an integer and $\lambda$ = a wave length in the transmission line. Since the length of the transmitter branch will be an odd number of quarter wave lengths and the impedance at the transmitter low, the impedance at the junction will be high during the keyed off intervals.

The second requirement that the receiver divert a minimum amount of power from the transmitter during the pulse periods and that the transmitter transfer power most efficiently to the antenna will be attained if the transmitter output circuit is matched to the transmission line and hence to the load circuit when the pulse is applied, and if, in addition, the receiver branch abstracts a minimum amount of power from the transmitter after the length of the receiver branch line, i. e., from the junction 13 to the transformer 17, is properly adjusted. The length of the receiver branch line is adjusted by observing the effect of the changes in length upon a received signal. When the signal reaches a maximum value, the length is properly determined.

The fact that the receiver abstracts a minimum or negligible amount of energy from the transmitter during the pulse period, while the receiver abstracts energy efficiently during the intervals when the transmitter is keyed off, and the fact that the transmitter delivers energy efficiently to the load circuit during the pulse period and abstracts a minimum or negligible amount of energy from the receiver during the reception period, may, upon initial reading, appear inconsistent with known circuit theory. However, upon closer inspection, it is not inconsistent because the impedances of the transmitter and receiver alternately change during their respective periods of operation. When the receiver is receiving energy from the load circuit, the transmitter impedance is different than it is during its pulse period. Since the transmitter impedance was matched to the transmission system during the pulse period, and since its impedance is materially different during the keyoff interval, the length of the line in the transmitter branch can be adjusted so that it offers high impedance at the junction point and therefore diverts a minimum amount of energy from the receiver branch.

The receiver input impedance also goes through a cycle of changes during the pulse period and intervals when the transmitter is keyed off respectively and therefore conditions similar to the foregoing may be applied to the receiver branch by adjusting the length $l$ of the line from the junction to the receiver.

In a preferred embodiment of our invention, see Fig. 2, a pulse generator 21 is connected in series with the bias battery 23 to key the push-pull oscillators 25. The input circuit and the output circuits of the oscillators are resonant lines, designated respectively by reference numerals 27, 29. A point intermediate the terminals of the resonant line 29 is connected to the positive terminal of the B source 31. The negative terminal of the source 29 is connected to the cathodes of the oscillators and to the positive terminal of the biasing battery 23.

The output circuit 29 is mutually coupled to the circuit 33 which has preferably an effective length of $$\frac{\lambda}{2}$$

This circuit 33 is coupled to a network 35 which includes not only matching transformers (which may be quarter wave concentric lines) but a means for efficiently interconnecting the symmetrical transmission line 33 to the coaxial line 37. The transmission line 37 is connected at a point B which is $$\frac{3}{4}\lambda$$

from one terminal of the network and $$\frac{5}{4}\lambda$$

from the other terminal. The transmission line 37 is terminated in a matching transformer 39 which may be a quarter wave concentric line as shown. The matching transformer 39 is connected to an inverted flat V antenna 41 which may be of a suitable number of wave lengths long and terminated in a resistor 43 which prevents undesired reflections. The inverted flat V antenna provides the required degree of directivity which is determined by its effective length while the terminating impedance prevents radiation in a direction opposite to the terminating impedance.

The receiving device 45 is connected as follows: a transmission line 47 is connected to the transmission line 37 at a point P which is substantially at a distance $$\frac{n\lambda}{2}$$

from point B. The length $l$ of the transmission line 47 is adjusted to obtain maximum energy transfer as described. The line 47 is terminated in a matching network 49 which may be a quarter wave concentric line as shown. The network 49 is mutually coupled M to the input of a radio frequency amplifier 51 which is suitably biased and coupled to the radio receiver 45, which may be a superheterodyne or the like. The several transmission lines are preferably of the concentric types which are well known to those skilled in the art. In reducing the foregoing system to practice, the adjustments hereinbefore described were followed to the end that energy was efficiently transferred to and from the antenna. While this is in accordance with the offered theory, i. e., that the operation depends upon adjustments of line lengths and changes in impedance of the transmitter and receiver, we do not wish to limit our invention to any precise theory of operation.

Thus we have described a signaling system which is coupled to a receiver and a transmitter, whereby the transmitter and receiver both alternately operate at high efficiencies. The transmitter is coupled to the antenna or load circuit by means of matching transformers and a transmission line. The receiver is coupled to the transmission line and to the antenna by a connection to a point of high impedance with respect to the transmitter output coupling circuit whereby negligible small amounts of power are diverted from the receiver to the transmitter during reception and to the receiver during transmission. Thus arranged the pulses are efficiently radiated and are received after reflection on the common antenna without substantial losses due to the use of a common antenna.

While the invention has been described in its preferred form as applied to a radio echo system, it should be understood that it is applicable to both high and low frequency signaling systems. When low frequencies are used, the transmission lines may be replaced by well known equivalents such as filter networks. It will be apparent that the invention may be applied to cable systems for locating faults or for signaling purposes, transmission networks, underwater signaling and the like where power is alternately applied to and subtracted from a common load circuit by transmitters or receivers whose impedance change during their respective cycles. The invention may also be applied to duplex signaling systems which are synchronized to alternately apply signals to an output circuit.

We claim as our invention:

1. A signaling system including in combination a load, a transmitter, a first transmission system connected between said load and said transmitter to transfer maximum power at a predetermined frequency from said transmitter to said load, a receiver, a second transmission system, means coupling said receiver to said second transmission system, and a connection between said first and second transmission systems at a point where the first transmission system from said point to said transmitter will have substantially no effect on said second system when said receiver is operated at said predetermined frequency and said transmitter is not energized.

2. A signaling system including in combination an antenna, a transmitter, a first transmission line connected between said antenna and said transmitter to transfer maximum power from said transmitter to said antenna, a radio receiver, a second transmission line, means coupling said receiver to said second line, and a connection between said first and second lines at a length from said transmitter to said connection at which said transmitter will have substantially no effect on said second line when said receiver is operated and said transmitter is not energized, said second line being of a length which is so chosen that the second line will have a negligible effect on said first line when said transmitter is operated.

3. A signaling system including in combination a load circuit, a transmission line, a source of radio frequency energy of predetermined frequency, means for coupling said load circuit and said source to the terminals of said transmission line, a radio receiver, a second transmission line, means coupling said receiver to said second line, and a connection from said second line to said first-mentioned transmission line at a point on said first-mentioned transmission line at which the second line has a negligible effect on said first line when said energy is applied, said second line having a length which offers at said predetermined frequency an impedance of the order of the operating input impedance of said radio receiver.

4. A signaling system including in combination a radiator, a transmission line, a source of energy of predetermined radio frequency, means for coupling said radiator and said source to the terminals of said transmission line whereby the impedances of said radiator, line and source are appropriately matched, a radio receiver, a second transmission line, a connection from said second line to said first-mentioned transmission line at a length from said transmitter at which the second line has a negligible effect on said first line during periods of transmission at said predetermined frequency, and means coupling said receiver to said second line, said last coupling means being matched to effect maximum transfer of received energy to said receiver at said predetermined frequency.

5. A signaling system including an antenna, a transmitter having a low impedance output circuit, a radio receiver, a first transmission line having input and output terminals, a matching network for connecting said input terminals to said output circuit, a second matching network for connecting said output terminals to said antenna, a second transmission line connected to said first line at a distance equal to $$(2n + 1)\frac{\lambda}{4}$$

from said output circuit, and means coupling said radio receiver to said second line.

6. A signaling system including an antenna, a transmitter having a low impedance output circuit, a radio receiver, a first transmission line having input and output terminals, a matching network for connecting said input terminals to said output circuit, a second matching network for connecting said output terminals to said antenna, a second transmission line connected to said first line at a distance equal to $$(2n + 1)\frac{\lambda}{4}$$

from said output circuit, and means coupling said radio receiver to said second line and having a transfer ratio which will transfer substantially the maximum power from said antenna to said receiver.

7. A signaling system including an antenna, a transmitter having a symmetrical output circuit, a radio receiver, a first transmission line, a circuit having an effective half wave length coupled to a network having a total effective length equal to $$(2n + 1)\frac{\lambda}{4}$$

said first transmission line being connected to said network at points equal in distance to $$(2n + 1)\frac{\lambda}{4}$$

and $$(2n + 3)\frac{\lambda}{4}$$

from said half wave length circuit, means coupling said symmetrical output circuit and said half wave circuit, a second transmission line coupling said receiver to points of maximum impedance on said first transmission line, and means coupling said antenna to said first transmission line.

8. In a system of the character of claim 7, means for terminating said second transmission line whereby said first and second lines are terminated in their characteristic impedance at said receiver with respect to received currents.

9. A transmitter whose impedance at a predetermined frequency is different when keyed on and when keyed off, a receiver whose impedance at said predetermined frequency is different for high intensity signals than for low intensity signals, an output circuit, means for coupling the transmitter and receiver so that the transmitter will be matched to the output circuit during the key on period but will present a high impedance during key off period and the receiver will be matched to the output circuit during the key off period of the transmitter but will present a high impedance during the key on period, said transmitter and said receiver being operated alternately at said predetermined frequency.

10. A signaling system including in combination, a transmitter, means for keying said transmitter, said transmitter having a different impedance during key on and key off cycles and having a predetermined operating frequency, a receiver having an input impedance which varies between large amounts of applied power and low amounts of applied power and having an operating frequency equal to said predetermined frequency, means coupling said transmitter and receiver to a common load, and means for adjusting said coupling so that said transmitter impedance will be matched to said load circuit during said key on cycles and so that said receiver impedance will be matched to said load circuit during said key off cycles.

11. A signaling system including in combination, a transmitter, means for keying said transmitter, said transmitter having a different impedance during key on and key off cycles and having a predetermined operating frequency, a receiver having an input impedance which varies between large amounts of applied power and low amounts of applied power and having an operating frequency equal to said predetermined frequency, means coupling said transmitter and receiver to a common load, and means for adjusting said coupling so that said transmitter impedance will be matched to said load circuit during said key on cycles and will represent a high impedance during said key off cycles and so that said receiver impedance will be matched to said load circuit during said key off cycles.

12. A signaling system including in combination, a transmitter, means for keying said transmitter, said transmitter having a different impedance during key on and key off cycles and having a predetermined operating frequency, a receiver having an input impedance which varies between large amounts of applied power and high for low amounts of applied power and having an operating frequency equal to said predetermined frequency, means coupling said transmitter and receiver to a common load, and means for adjusting said coupling so that said transmitter impedance will be matched to said load circuit during said key on cycles and so that said receiver impedance will be matched to said load circuit during said key off cycles and will represent a high impedance during said keying cycles.

13. A signaling system including in combination, a transmitter, means for keying said transmitter, said transmitter having a different impedance during key on and key off cycles and having a predetermined operating frequency, a receiver having an input impedance which varies between large amounts of applied power and low amounts of applied power and having the same operating frequency as said transmitter, means coupling said transmitter and receiver to a common load, and means for adjusting said coupling so that said transmitter impedance will be matched to said load circuit during said key on cycles and will represent a high impedance during said key off cycles and so that said receiver impedance will be matched to said load circuit during said key off cycles and will represent a high impedance during said key on cycles.

14. A signaling system including in combination an antenna, a radio frequency pulse transmitter tuned to a predetermined frequency, said transmitter having a high output impedance when keyed off and a different output impedance when keyed on, a transmission line coupled to said antenna, a transmitter branch line, a receiver branch line, said lines being connected at a common junction, a radio frequency receiver having a low input impedance to large amounts of applied power and a high input impedance to low amounts of applied power and having a response frequency equal to said predetermined frequency, means coupling said transmitter branch line to said transmitter output circuit so that said transmitter output impedance is matched to said antenna during key on periods and unmatched during key off periods, and means coupling said receiver branch line to said receiver input so that said receiver impedance is matched to said antenna during said key off periods and unmatched during said key on periods.

15. A signaling system including in combination an antenna, a radio frequency pulse transmitter arranged to operate at a predetermined frequency, said transmitter having a high output impedance when keyed off and a different output impedance when keyed on, a transmission line coupled to said antenna, a transmitter branch line, a receiver branch line, said lines being connected at a common junction, a radio frequency receiver having an impedance which varies for different amounts of applied input power and having a response frequency equal to said predetermined frequency, means coupling said transmitter branch line to said transmitter output circuit so that said transmitter output impedance is matched to said antenna during key on periods and unmatched during key off periods, and means coupling said receiver branch line to said receiver input so that said receiver impedance is matched to said antenna during said key off periods and unmatched during said key on periods.

16. A signaling system, comprising a transmitter, a receiver, an antenna system, and transmission lines of fixed lengths connecting said transmitter and said receiver to said antenna system and in which the load impedances of said transmitter and said receiver change from conditions of operation or nonoperation, and in which said transmission lines invert said impedances respectively to make an efficient or an inefficient coupling to said antenna.

17. A signaling system, comprising a transmitter, a receiver, said transmitter and receiver including impedances varying between low values and high values for operating and non-operating conditions, said transmitter and said receiver being tuned to the same operating frequency, an antenna, and means respectively coupling said transmitter and said receiver to said antenna, the impedance of said coupling means varying automatically between operating and non-operating values in response to variations in said transmitter and receiver impedances so that the operating receiver or operating transmitter is effectively connected to said antenna and the non-operating receiver or transmitter is ineffectively connected to said antenna.

18. A signaling system, comprising a transmitter, a receiver, said transmitter including an impedance which changes from a low value to a high value during transmission and non-transmission respectively, an antenna system, and transmission lines of fixed lengths respectively connecting said transmitter and said receiver to said antenna system to match said transmitter impedance to said antenna during transmission and to prevent said receiver from abstracting substantial amounts of energy during transmission and to match said receiver to said antenna during non-transmission and to prevent said transmitter from abstracting substantial amounts of received energy during non-transmission periods.

IRVING WOLFF.
WILLIAM D. HERSHBERGER.